April 11, 1967          G. U. OPPEL          3,313,204
PHOTOELASTIC STRAIN GAUGE WITH BUILT-IN STRESS PATTERN
Filed May 29, 1959          3 Sheets-Sheet 1
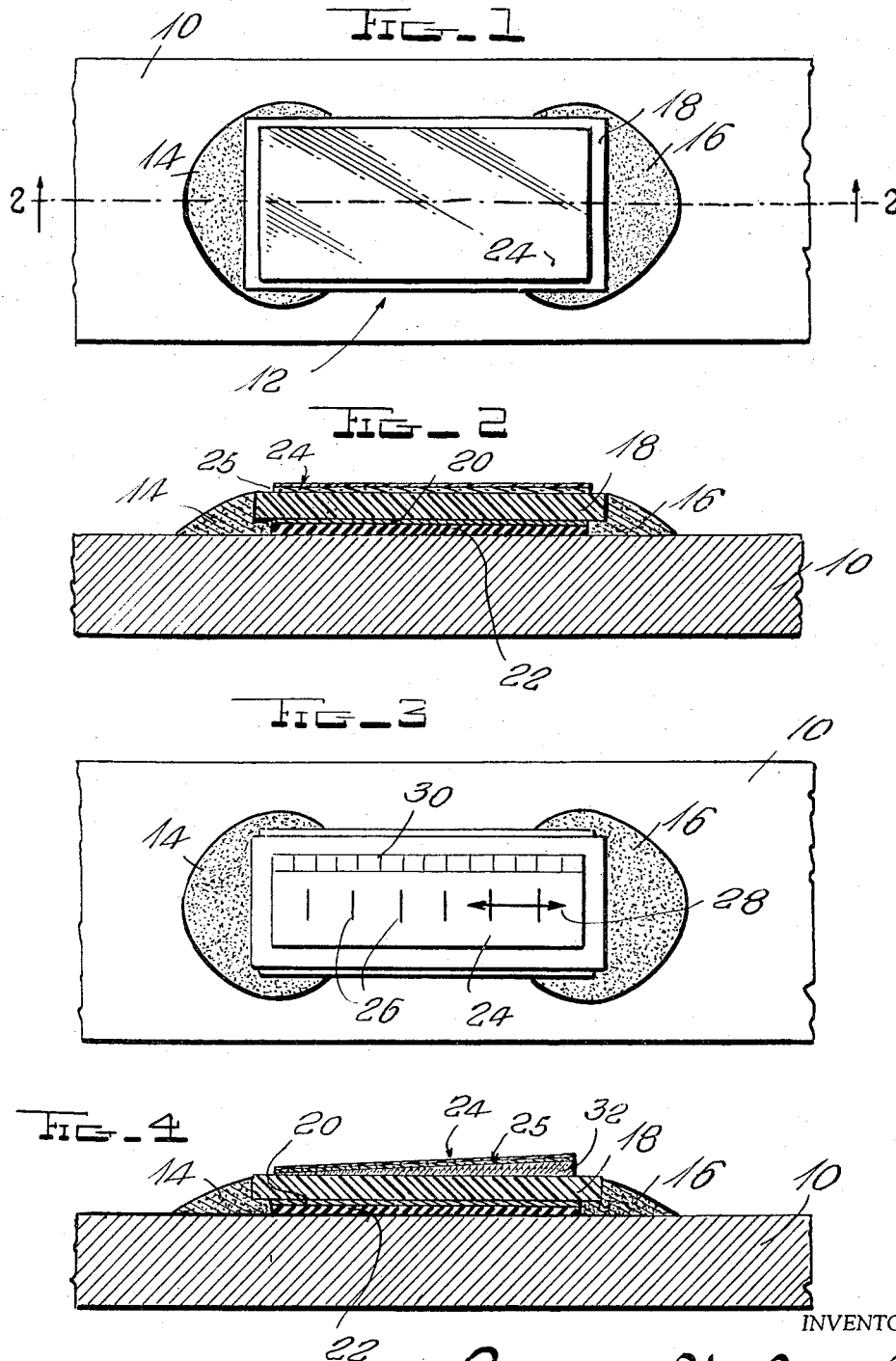
INVENTOR
George U. Oppel,
BY John B. Brady
ATTORNEY

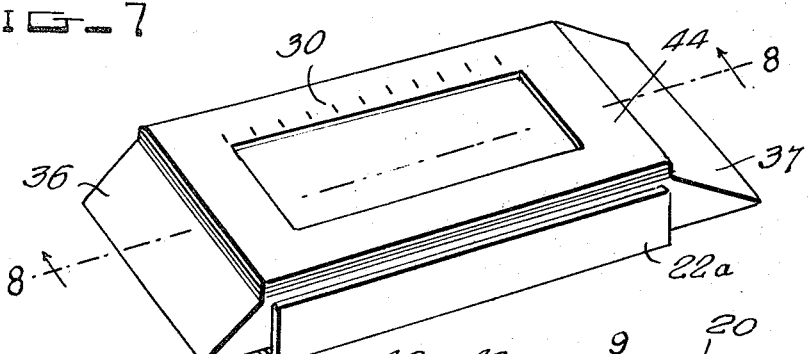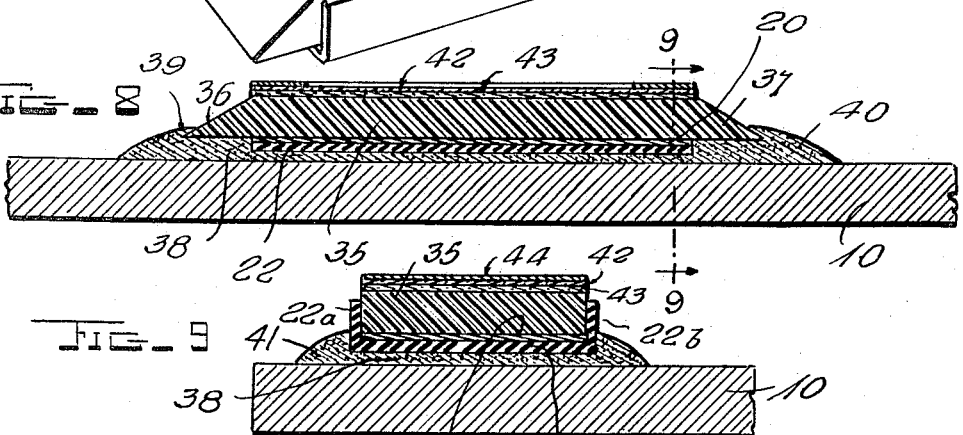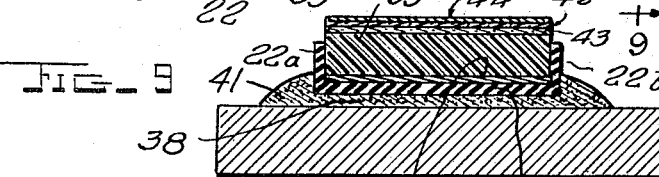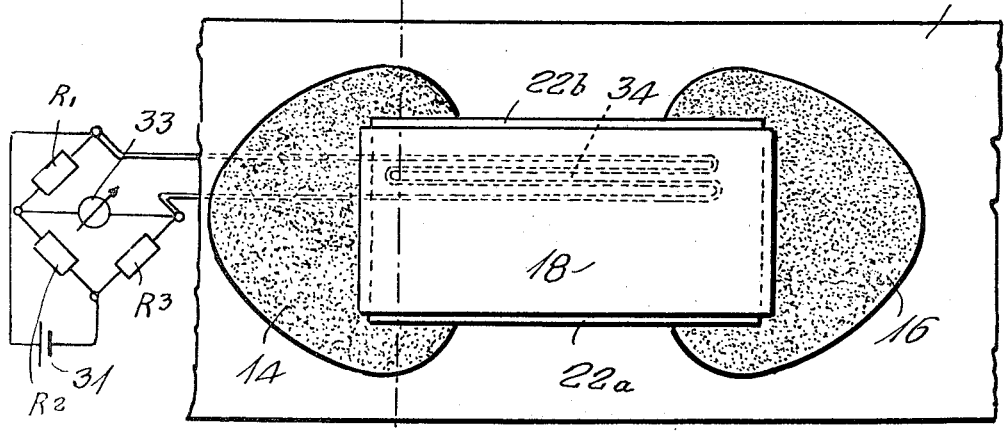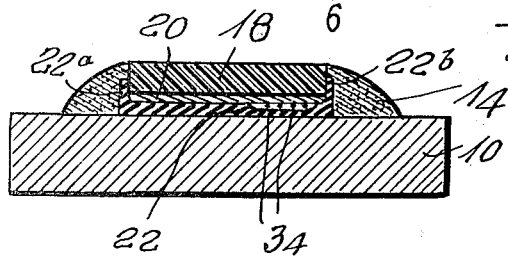

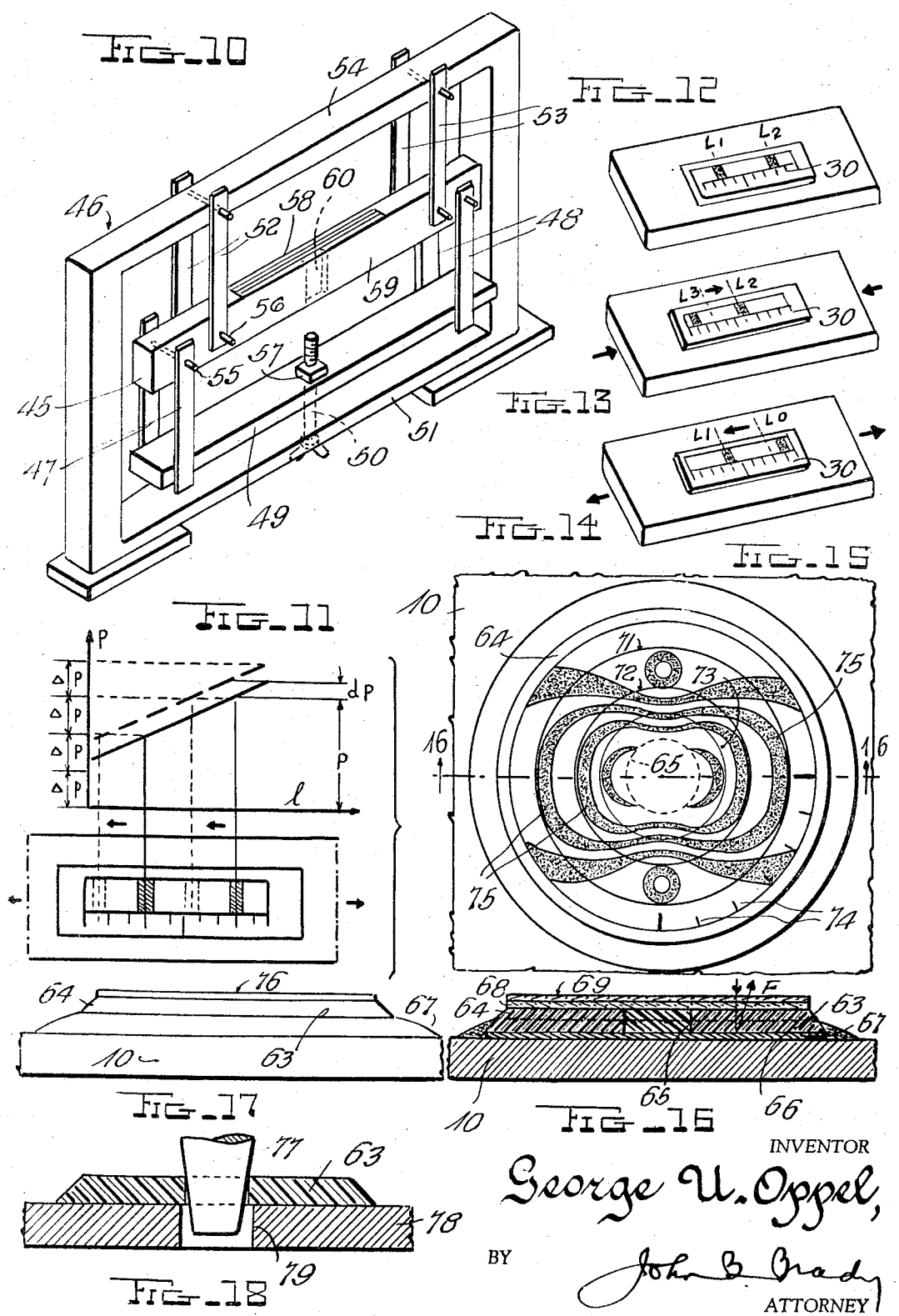

United States Patent Office 3,313,204
Patented Apr. 11, 1967

3,313,204
PHOTOELASTIC STRAIN GAUGE WITH
BUILT-IN STRESS PATTERN
George U. Oppel, State College, Pa. (Putzstrasse 17, 5321 Niederbachem, Germany)
Filed May 29, 1959, Ser. No. 816,918
Claims priority, application Germany, July 25, 1958,
O 6,284
12 Claims. (Cl. 88—14)

My invention relates to a new photoelastic strain analysis method and the structure of an element for direct strain readings and for conducting such strain analysis.

One of the objects of my invention is to provide an improved frozen stress method for setting fixed stress fringes by elastic deformation in a photoelastic strain indicating element.

Another object of my invention is to provide an improved method for optically indicating displacement of photoelastic strain fringes in a photoelastic element viewed through polarized light.

A further object of my invention is to provide an improved structural assembly for a photoelastic strain gauge comprising an optically inhomogeneous deformable layer of photoelastic material observable while subjected to stress under polarized light for producing optical phase differences which render a set of interference lines visible in the deformable layer.

Still another object of my invention is to provide a laminated assembly for a photoelastic strain gauge consisting of a photoelastic strain indicating element suitably covered along its side faces and having its base partially covered by a mirrored surface and secured at the back of the mirrored surface and around the periphery thereof to the structural member whose stresses are to be determined, the top surface of said element being covered by superimposed quarter wave and polarized plates through which light enters the photoelastic strain indicating element.

A still further object of my invention is to provide a laminated assembly of photoelastic strain gauge which is resiliently supported with respect to the structural member whose stresses are to be determined.

Still another object of my invention is to provide a laminated assembly for a photoelastic strain gauge which also includes an electrical resistance element subject to change in effective resistance pursuant to change in deformation of the photoelastic assembly, the said resistance element being electrically connected to remote metering means for providing telemetering responses additional to optical stress indications in measuring strain in associated structural members.

Other and further objects of my invention reside in the method of operation and the structural assembly of a photoelastic stack and optical indicator assembly of strain gauge as set forth more fully in the specification hereinafter following by reference to the accompanying drawings, in which:

FIG. 1 is a plan view of a photoelastic strain gauge shown in position on a structural member for the optical indication of strains in the structural member;

FIG. 2 is a longitudinal sectional view taken on line 2—2 of FIG. 1;

FIG. 3 is a plan view similar to FIG. 1 but illustrating a calibrated scale associated with the top of the photoelastic strain indicating element;

FIG. 4 is a longitudinal sectional view through the photoelastic strain gauge indicating element equipped with a modifying arrangement of plate for displaying a set of interference lines at the top of the photoelastic strain indicating element;

FIG. 5 is a plan view of a modified form of photoelastic strain gauge embodying my invention in which an optical resistance wire or foil element is included in the photoelastic assembly;

FIG. 6 is a transverse sectional view taken on line 6—6 of FIG. 5;

FIG. 7 is a perspective view showing a further modified form of photoelastic strain gauge embodying my invention;

FIG. 8 is a longitudinal sectional view taken on line 8—8 illustrating the photoelastic strain gauge bonded to a structural element of which a strain analysis is to be made;

FIG. 9 is a transverse sectional view on line 9—9 of FIG. 8;

FIG. 10 is a schematic view of one form of tensioning rig by which frozen stress lines are originally set in the photoelastic element;

FIG. 11 is a theoretical diagram showing by vector analysis the manner in which the photoelastic element shifts interference lines therein due to phase differences in the pressure forces exerted on the element;

FIG. 12 is a perspective view illustrating a condition of operation of the strain gauge of my invention and showing schematically the position of interference lines with respect to the scale of the structure;

FIG. 13 is a view of the photoelastic strain gauge of FIG. 12 but illustrating the shift in position of the interference lines when the assembly is subjected to longitudinal tension;

FIG. 14 is a view similar to the views illustrated in FIGS. 12 and 13, but showing the strain gauge assembly subjected to compression and illustrating the shift of the interference lines under such conditions;

FIG. 15 is a plan view of a modified form of photoelastic strain gauge where the strain gauge element is circular in contour;

FIG. 16 is a transverse sectional view taken on line 16—16 of FIG. 15, and illustrating both a polarizing layer and a quarter wave plate associated with the photoelastic strain gauge plate;

FIG. 17 is a sectional view through a strain gauge where the polarizing layer and the quarter-wave plate are combined into the same layer extending across the photoelastic plate; and FIG. 18 schematically illustrates a rig for initially setting the interference pattern lines in the circular structure of strain gauge shown in FIGS. 15–17.

Strain measurements are conducted on various structural members and machine parts, etc., chiefly by use of the so-called electrical resistance wire or foil strain gauges. The electrical resistance of such resistance wire or foil gauges undergoes a change when the gauge is subjected to deformation and this change then is measured by the aid of electrical amplifiers and electrical measuring instruments. Such electrical resistance wire strain gauges therefore have to be electrically connected to the recording instruments as for instance to an oscilloscope and the application of such gauges to rotating parts becomes difficult due to the necessity of providing sliding contacts which almost inevitably cause trouble and errors due to their influence on the very feeble currents resulting from changes in resistance occurring in the measuring gauge.

Contrary to the electrical resistance strain analysis method as herein described, the photoelastic strain analysis of my invention makes it possible to conduct a stroboscopic reading of the performance of a photoelastically strain direct indicating element in such cases as in strain analysis on rotating bodies. The new photoelastic strain analysis method offers at the same time an accuracy superior to that of previous photoelastic methods. Heretofore, when photoelastically active materials such as epoxy resins, glass, etc., were used for measuring strain at the surface of structural parts made of steel, aluminum, concrete, wood, etc., an accuracy fulfilling technical requirements, could be obtained only if optical precision instruments were employed additionally for measuring the small optical changes occurring in the photoelastic material when transmitting the strain from the structural part by a bonding glue. Such optical precision instruments are expensive and difficult to handle. Trained personnel are required for handling such instruments. Such essential requirements have restricted the general application of such previous methods in strain analysis. Observing the changes in color displayed by a photoelastic bonded material if this material is subjected to elastic deformation heretofore did not provide enough details for a thorough interpretation of the existing strains. The same is true of the so-called photostress method by aid of which strains are analyzed at the surface of structural parts as shown by the applicant (see G. Oppel in journal, "Zeitschrift des Vereins Deutscher Ingeneieure," vol. 81, pp. 803/804, 1937).

By the herein described photoelastic strain analysis method of my invention, a photoelastically active layer is employed and bonded to the structural parts, the strains of which have to be analyzed. A mirror is arranged at the back of the layer between layer and structural part. The mirror reflects the polarized light entering the layer or the gauge. It is characterized by my new photoelastic strain analysis method that a set of interference fringes visible in the layer when subjected to polarized light and viewed through an analyzer is displaced in easily measurable amounts if the layer is strained as occurs by transmitting strains from a structural part to which the layer is attached. These displacements of the set of interference lines or interference fringes are of such magnitudes that even small strains can be detected and measured in this manner by the unaided senses. Thus, the formerly mentioned optical precision instruments are no longer necessary and direct readings of the strains in structural parts can be taken.

A preferred photoelastic arrangement for conducting the new photoelastic strain analysis method is characterized by the fact that the photoelastically active layer consists of an optically inhomogeneous material, with indices of refraction in any two directions at a given point of differing values thereby causing relative retardation of a light wave such that under observation in rays polarized of light, phase differences occur, rendering a set of interference lines visible in the deformable layer. Materials which have optically inhomogeneous characteristics can be produced by a special treatment of transparent bodies as made of glass or resins, etc., by subjecting such bodies to stress and strain. One method of accomplishing this is the so-called frozen stress method as proposed and described by the applicant earlier (see G. Oppel, "Investigation of three dimensional stress and strain conditions" in National Advisory Committee Aeronautics Technical Memo 824, 1937, and M. Hetenyi, Handbook of Experimental Stress Analysis, John Wiley & Sons, Inc., N.Y. 1950). The preparation of such inhomogeneous materials is known from investigations of three dimensional states of stress.

A set of interference lines as used in this method can also be obtained by adding a plate containing optical inhomogeneity to the photoelastically active layer, the latter being bonded to the surface of structural parts to be analyzed.

In the photoelastic strain analysis method according to my invention the use of polarized light is required. I arrange a polarizing film, or a polarizing film together with a one-quarter-wave plate and color filter or, I arrange one film in which these characteristics are combined, disposed in front or on top of the gauge plate. I may also utilize a beam of polarized light from a polarized light source and observe the motion of the set of interference lines due to changes in strain by looking through another polarizer which generally is called the analyzer. Two quarter-wave plates and color filters may also be utilized in this setup.

Reading the change in strain is also facilitated by arranging a scale adjacent to the photoelastically strain indicating element. In order to utilize the element to strains in one direction only, a strain transmitting bonding of the element to the structural part to be investigated is provided for certain regions of the element only. For this purpose the photoelastically strain indicating layer may have a form of a relatively flat rectangular strip, the ends of which are bonded to the structural part only. In other cases the layer displaying the optical inhomogeneity may be bonded at its outer circumference only. In order to prevent certain regions of the photoelastically strain indicating element from being bonded to the structural part in a rigid manner the element may be covered by a soft material as for instance by rubber or asbestos or disposed in the region between the two ends of said strip and also at its side faces.

If, besides the direct readings of the photoelastically strain indicating element, telemetric readings must also be taken, then the element of my invention must additionally have an electrical resistance wire or resistance foil arranged at the back or in front of the photoelastically active layer. For further increasing the sensitivity of the element, notches, holes, or fillets may be arranged in the photoelastically active layer.

Referring to the drawings in more detail, FIG. 1 shows a photoelastically strain indicating element designated by reference character 12 and fixed by bonding to a bar or structural member designated by 10, whose stresses are to be determined. Fixing of the element 12 to the bar 10 is performed by bonding both ends 14 and 16 of the element by using a glue or weld. The strain indicating element consists of a photoelastically active layer 18, shown in FIGS. 2, 4 and 6, having a mirror 20 at its back made for example by silvering or aluminizing said layer at its rear face. The strain indicating element is resiliently mounted on rubber layer 22. The rubber layer 22 or the other covering material, such as for example asbestos, have to be much softer than the material from which the photoelastically active layer 18 such as epoxy resin, glass is formed.

To the front face of the photoelastically active layer 18 there is fixed, for example by gluing, a polarizing film 24, or a laminated assembly consisting of polarizing film 24 together with a quarter wave plate 25.

In FIG. 3 a set of interference lines 26 can be seen. These interference lines undergo a displacement in direction of the arrow 28, if straining of the photoelastic strain indicating element, that is, if straining of the structural part 10 to which the element is bonded by gluing, takes place. The magnitude of the displacement of an interference line 26 with respect to the scale 30 is in simple relation to the strain acting in the structural part 10 and transmitted for measurement to the element 18. The scale 30 of the element 18 is calibrated in strain or stress units, or the relation of scale and strain units is given by a gauge factor.

While in the photoelastic strain indicating elements according to FIGS. 1 to 3, the origination of the set of interference lines 26 is caused by the optical inhomogeneity of the photoelastically active layer 18 itself, in the element of FIG. 4 such a set of interference lines originates from another plate 32, which is shaped like a wedge, as shown in FIG. 4, or like a flat parallel plate. This plate 32 displays initially in the unloaded state its optical inhomogeneity causing by this a set of interference lines 26. Examples of this piece would be a Babinet compensator or birefringent material with a frozen-in stress pattern. The construction as shown in FIG. 4 corresponds in other details to the construction as shown in FIGS. 1 to 3. The displacement of the set of interference lines 26 as visible in an element according to FIG. 4 can also be read easily by using a scale such as 30 arranged on top of such element.

FIGS. 5 and 6 illustrate a photoelastically strain indicating element which has additionally an electrical resistance wire or foil 34 built into the assembly. The resistance of such wire or foil 34 is changed by deformation as the wire or foil undergoes deformation. By the combination of the direct readable photoelastically strain indicating element 18, on scale 30, that is the self-contained photoelastic element with the electrical gauge, provided by connecting a meter 33 in a balanced Wheatstone bridge or potentiometer circuit, including resistances $R_1$, $R_2$ and $R_3$ in the arms thereof and a source of potential 31, a special advantage is obtained by the fact that besides the readings on scale 30, strains can be telemetered from the some gauge and read on meter 33, and errors in electrical measurements by faulty gluing can be avoided. This advantage is established by the fact that bonding control is improved by direct readability. Faults become optically visible at once. FIGS. 1, 3 and 5 also demonstrate that special covering of the element 18 and gluing procedure allow transmitting of those strains only which are going to be measured. The exclusion of other strains than those to be measured is effected by using softer material such as rubber 20 for covering those areas of the strain indicating element 18 which should not be bonded by gluing.

In FIGS. 7 and 8, I have shown a structure of photoelastic element 35, the opposite ends of which are tapered as represented at 36 and 37 and the bottom of which is silvered as represented at 20 to provide the mirror for the optical reflection of light through the photoelastic element 35. The mirror 20 is resiliently mounted on the rubber layer 22 which extends upwardly along opposite sides of the photoelastic element 35 as represented at 22a and 22b. A very thin layer of glue represented at 38 extends beyond the peripheral limits of the photoelastic element 35 as represented at 39 and 40 at opposite ends of the photoelastic element 35 and beyond opposite sides of the photoelastic element as represented at 41, in FIG. 9, for bonding the photoelastic strain gauge to the structural element 10 to be analyzed for strain.

The strain lines are visible through the top surface of the photoelastic element 35. Observation is made through the polarizer plate 42, laid over the quarter-wave plate 43 or incorporated in plate 42 which is attached by thin glue to the top surface of the photoelastic element 35 and covered by the plate 44 which carries the calibrated scale 30 with respect to which the interference lines visible through the polarizing plate 42 are displaced under pressure. In order to initially set the fringe lines in the photoelastic element I mount a lineally extending bar of the photoelastic material, such as resin, etc. as represented in FIG. 10 at 45 in a stress rig represented at 46 in which opposite ends of the bar are hinged by members 47 and 48 connected at their lower ends by a bar 49 which is centrally secured by an adjusting screw 50 to the power-part of the frame of the rig represented at 51. The bar of photoelastic material 45 is suspended from the top thereof through members 52 and 53 fastened to the top horizontal bar 54 of the frame of the rig and fastened to the bar of photoelastic material at positions 55 and 56. As screw 50 is adjusted by tensioning nut 57 the photoelastic bar 45 is subjected to pure bending. These fringe lines are obtained by utilizing the frozen stress method in the manner demonstrated in FIG. 10. A beam of epoxy resin 45 is placed into a bending frame 46 and then slowly heated to about 240 degrees Fahrenheit. At this temperature the beam 45 is subjected to pure elastic bending by tightening nut 57 on screw 50. By slow cooling of the beam to room temperature the imposed deformation and the fringe pattern are retained in the beam which then is cut into larger plates in longitudinal direction of the beam. These larger plates in turn are cut into small rectangular plates, such as 58 and 59. These plates may be cut to provide specimens such as 60. The length of the small plates is taken perpendicular to the axis of the beam in order to obtain the desired set of frozen-in fringe lines. These plates then serve as gauge plates of uniaxial photoelastic strain gauges.

In the unstrained condition the gauge displays for example a set of fringe lines $L_1$ and $L_2$ (FIG. 12), which were frozen-in by the manufacturing process. When subjecting the gauge to a negative strain by compressive stress the set of fringe lines moves in a certain direction (FIG. 13). Elongations by tensile stresses are causing the displacements of the fringe lines in the opposite direction (FIG. 14). In this manner positive and negative strains are distinguishable. Lines of higher or of lower order may enter the scaled field of observation when increasing the load. The distances of the lines stay equal in case of a linear phase difference frozen-in in longitudinal direction of the gauge plate.

These properties of the gauge are explained further by FIG. 11. Continuous changes of the load applied to the specimen cause continuously increasing strains and also continuously increasing displacements of the fringe lines in the gauge. This effect finds its explanation by the following:

A slope in the optical phase difference ($p$) was introduced in the gauge in direction of its longitudinal axis by applying the frozen stress method—as described before—in the manufacturing process of the gauge. An interference line originates in the gauge due to a certain phase difference $\Delta p$ (FIG. 11). If load is now applied to the specimen then the corresponding strain is transmitted from the specimen into the gauge by the bond and by this strain an additional phase difference $dp$ of the light originates from the photoelastic properties of the material of the gauge plate. This additional phase difference $dp$ moves the points of intersection with the lines $\Delta p$=constant, which latter determine the positions of the fringe lines. This means the positions of the fringe lines change continuously if a continuous change in strain takes place.

Upon release of tension on bar 45 the fringe lines return to the position $l_1$ and $l_2$ as represented in FIG. 11. When the strain gauge plate is cut and mounted in position in the strain gauge assembly shown in FIG. 12, the fringe lines $l_1$ and $l_2$ are displaced toward the left when the plate is in tension as illustrated in FIG. 13, or displaced toward the right as represented in FIG. 14 when the plate is placed under compression. These displacements are read with respect to scale 30 in determining the strain to which the structural member, on which the strain gauge is mounted, is subjected.

Heretofore, I have explained the application of my invention to strain gauges of rectangular contour. My invention is equally applicable to gauges of circular contour as represented in FIGS. 15 and 16. In this arrangement a disc-like structure of photoelastic material 63 is provided, the material being bevelled around its circumference as represented at 64. A film of sprayed aluminum is provided on the back of the disc-like member 63 as represented at 66 and serves as a mirror. The disc is fastened all over its rear face to the structural member 10 to be subjected to strain analysis by a thin glue represented at 67. In this form of device a rubber cushion is unnecessary. The disc structure is provided with a circular quarter-wave plate 68 extending across the top thereof over which there extends the polarizing plate 69 and on which the scales 71, 72 and 73 are arranged in concentric circles logarithmically related.

The scales 71, 72 and 73 may be printed or otherwise displayed upon a transparent film applied over the polarized plate 69. To further facilitate the reading of the fringe patterns I provide graduations 74 on the edge of the plates 69 or 68 as indicated in FIG. 15. The distortion of the circular fringe patterns when straining the specimen 10 are represented in FIG. 15 at 75.

The principal stress directions are indicated by the axes of symmetry of the distorted pattern. The magnitudes can be read from the displacement of the fringe lines with respect to their original positions. The scale of such a gauge consists of the radial graduation 74 and the circular concentric circles 71, 72 and 73. The points of the fringe pattern rotate for instance for 15 degrees if the load is applied under 15 degrees with respect to the direction above.

The polarizing plate 69 and the quarter-wave plate 68 may be combined into the same plate shown at 76 in FIG. 17. This combined film also constitutes a filter.

Stress applied to the disc 63 by movement of structural member 10 produces the optical effect of the fringe lines moving inwardly and outwardly with respect to the circular scales 71, 72 and 73, represented by pattern 75, providing a measurement of the strains in structural member 10 under the influence of polarized light directed into the disc 63. Suitable calibrations are provided in association with the circular markings 71, 72 and 73 and radial markings 74 in order to read relative strains in the structural member 10.

In all of the forms of my invention the polarized light has the effect of producing lines of equal optical phase difference the changes of which—caused by straining the gauges—produce additional phase differences and a displacement of the fringe lines, thereby rendering the strain gauge easy to read, particularly after extended experience with such readings.

In order to freeze the fringe lines in the circular disc type form of my invention, I use a rig of the kind illustrated in FIG. 18 in which the photoelastic plate 63 is prepared from optically inhomogeneous material produced by a special treatment of transparent bodies of glass or resins having a central hole 65 therein. The plate 63 is heated to a temperature range of 250° F. and a plug 77 pressed into the plate 63 supported on mounting plate 78, apertured at 79. The plug 77 introduces radial stresses in plate 63, establishing circular fringe patterns 75 in the plate 63. The plate 63 is then cooled down to room temperature slowly. The hole 65 is closed by a filling of the optically inhomogeneous material from which plate 63 is formed and the plate either polished on its rear surface or provided with a silvered coating to form a mirror, and the plate then bonded to the specimen being analyzed for strain study. The patterns formed by the fringe lines 74, shown in FIG. 15, then determine the strain characteristics of the specimen. When the polarizing film 69 and the quarter-wave plate 68, or the combined polarizing layer and the quarter-wave plate 76, are viewed in a light ray path indicated at F in FIG. 16, and strains applied to the specimen 10 the strain patterns vary in position and distortion and may be read through the quarter-wave plate 68 and the polarizing film 69 and the calibrations thereon when determining the magnitude and distribution of the strain.

It will be understood that wherever the terminology "stress fringes," "fringe lines," "strain fringes," "interference lines," or the like appears, it means a state of frozen-in stress gradient which appears as photoelastic fringe lines when illuminated with polarized light and viewed through a polarizing analyzer.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A photoelastic strain gauge comprising a photoelastic layer of material, means bonding said material to a structural part subject to strain analysis, a mirror interposed between the structural part and the bottom surface of said photoelastic layer, said photoelastic layer of material being optically inhomogeneous so that the indices of refraction at a given point are of differing values thereby causing relative retardation of a light wave whereby if polarized light is employed stress fringe lines of varying colors are present when viewed through a polarizing analyzer and are a function of a fixed stress pattern induced by heating the material above its elastic-visco-elastic phase point, applying a load, maintaining the load and slowly cooling the piece below the phase point to establish said stress pattern so that it is fixed free of any external forces to create the optical inhomogeneity, and means for subjecting said photoelastic layer of material to polarized light such that colored fringe lines and their displacement are observable as the structural part and the photoelastic layer of material, by being attached thereto, are subjected to strain.

2. A photoelastic strain gauge as set forth in claim 1 in which said means for subjecting said photoelastic layer of material to polarized light consists of a polarizing film extending over the top surface of said photoelastic layer of material.

3. A photoelastic strain gauge as set forth in claim 1 in which a resilient sheet of material is interposed between the bottom surface of said mirror and the said structural part, and the bonding means is cement which connects the photoelastic material directly to the structural part.

4. A photoelastic strain gauge as set forth in claim 1 in which a resilient sheet of material extends beneath the bottom of said photoelastic layer of material with two opposite edges of the resilient sheet extending upwardly at opposite sides of the photoelastic layer of material, and said means for bonding said photoelastic material to the structural part consisting of a glue extending from said structural part over the sides of the upwardly extending resilient sheet but contacting the ends of said photoelastic layer of material so that it is fastened through glue with said structural part.

5. A photoelastic strain gauge as set forth in claim 1 in which said photoelastic material is apertured throughout a portion of its area.

6. A photoelastic strain gauge as set forth in claim 1 in which said photoelastic material is substantially rectangular in contour and wherein the means bonding said material to the structural part is fastened between opposite ends of said photoelastic material and said structural part.

7. A photoelastic strain gauge as set forth in claim 1 in which said photoelastic material is circular and in which a circular polarizing plate extends over the top of said circular photoelastic layer of material.

8. A photoelastic strain gauge as set forth in claim 1 in which said photoelastic layer of material is circular in contour and a circular quarter-wave plate covered by a circular polarizing light plate extending over the top surface of said photoelastic layer of material.

9. A photoelastic strain gauge as set forth in claim 1 in which said photoelastic layer of material is circular in contour and wherein a circular light polarizing plate extends over the top of said photoelastic layer of material, said light polarizing plate having a plurality of spaced concentric circular and radial gauge lines therein for optically determining the displacement of the stress fringe lines in said photoelastic layer of material.

10. A photoelastic strain gauge as set forth in claim 1 in which said photoelastic layer of material is circular in contour and is apertured at the center thereof and wherein a circular light polarizing plate extends over the top of said photoelastic layer of material and over the center aperture therein and a plurality of concentric circular and radial gauge lines in said circular light polarizing plate disposed between the position of said center aperture and the periphery of said circular polarizing plate.

11. A photoelastic strain gauge as set forth in claim 1 in which a wedge-shaped plate containing interference lines extends over the top of said photoelastic layer of material, said wedge-shaped plate tapering from a maximum depth at one end of said layer to a minimum depth at the opposite end of the layer.

12. A photoelastic strain gage comprising a photoelastic layer of material, means bonding said material to a structural part subject to strain analysis, a mirror interposed between the structural part and the bottom surface of said photoelastic layer, said photoelastic layer of material being optically inhomogeneous so that the indices of refraction in any two directions at a given point are not equal thereby causing relative retardation of a light wave whereby if polarized light is employed stress fringe lines of varying colors are present when viewed through a polarizing analyzer and are a function of a fixed stress pattern induced by heating the material above its elastic-viscoelastic phase point, applying a load, maintaining the load and slowly cooling the piece below the phase point to establish said stress pattern so that it is fixed free of any external forces to create the optical non-homogeneity, said fixed stress pattern being a stress gradient such that the stress fringe lines appear perpendicular to a given axis of the gage and parallel to its top face when the photoelastic material is subjected to polarized light, said fringe lines being bodily displaced along such axis when the gage is subjected to strain and in proportion thereto, and means for subjecting said photoelastic layer of material to polarized light for observing the colors of the stress fringe lines and their displacement as the structural part and the photoelastic layer of material attached thereto are subjected to strain.

References Cited by the Examiner

UNITED STATES PATENTS

| | | | |
|---|---|---|---|
| 2,014,688 | 9/1935 | Mabboux | 88—14 |
| 2,074,106 | 3/1937 | Foster | 88—14 |
| 2,120,365 | 6/1938 | Kriebel | 88—14 |
| 2,174,269 | 9/1939 | Land | 88—14 |
| 2,322,319 | 6/1943 | Ruge | 73—88.5 |
| 2,625,850 | 1/1953 | Stanton | 88—14 |
| 2,672,048 | 3/1954 | Ruge | 73—88.5 |
| 2,724,964 | 11/1955 | Singdale | 73—88 |
| 2,813,958 | 11/1957 | MacDonald | 73—88.5 |

FOREIGN PATENTS

| | | |
|---|---|---|
| 1,161,842 | 3/1958 | France. |
| 1,148,457 | 4/1959 | France. |
| Ad. 71,278 | | |

JEWELL H. PEDERSEN, *Primary Examiner.*

E. G. ANDERSON, *Examiner.*

R. C. KLETT, J. E. COINER, T. L. HUDSON, O. B. CHEW, *Examiners.*